Dec. 15, 1953  A. BRANDT  2,662,294
MECHANICAL GAUGE
Filed Nov. 6, 1951
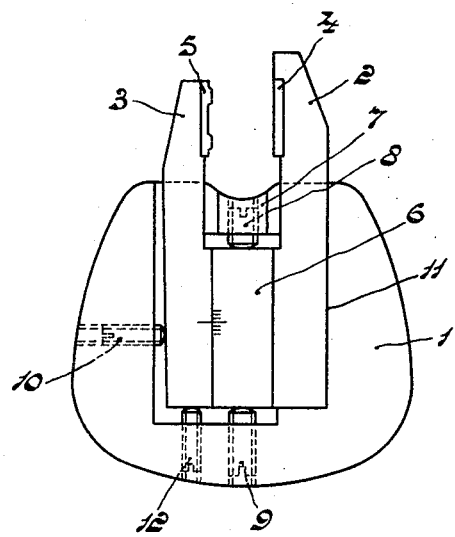
INVENTOR
Adrianus Brandt
By [signature]
Agent Patented Dec. 15, 1953

2,662,294

UNITED STATES PATENT OFFICE 2,662,294

MECHANICAL GAUGE

Adrianus Brandt, Eindhoven, Netherlands, assignor to Hartford National Bank and Trust Company, Hartford, Conn., as trustee Application November 6, 1951, Serial No. 255,019

Claims priority, application Netherlands March 13, 1951

3 Claims. (Cl. 33—168)

Gauges may be constructed to permit a definite non-adjustable measurement to be determined, the gauge then comprising several fixed, accurately finished measuring surfaces. When the measuring surfaces become worn, the gauge can be resurfaced only for larger measurements, unless having recourse to expensive and difficult treatments, for example electro-deposition of chromium followed by grinding to the desired measure. In order to avoid this limitation readjustable gauges have been devised, but these suffer from the disadvantage that they can be adjusted to measure only by skilled workmen and, moreover, that readjustment and resurfacing after wear can also be effected only by skilled labor. Even then the treatment occupies much time and is expensive. Usually, adjustment and readjustment is effected in such manner that the measuring surfaces are adjustable by means of screws in a direction at right angles to the measuring surface. These screws should not only be accurately machined and make a close fit in the housing of the gauge, but the screws must also in turn be secured in position. In practice it is found that after this treatment the gauge has slightly changed in measure, so that a final readjustment is necessary.

The gauge according to the invention does not suffer from the said disadvantages and is adjustable in a simple manner by unskilled labor. However, it is readjustable to the desired measure in a short time and also by unskilled labor.

According to the invention the gauge comprises a U-shaped housing, two measuring beams fitted in this housing and a trapezoidal intermediate piece, the latter being adjustable in a direction parallel to the longitudinal direction of the measuring beams. If the trapezoidal intermediate piece has three mutually perpendicular sides and the fourth side only has a small slope of, say, 1 to 500 or 1 to 1000 with regard to the opposite side, a comparatively large displacement of the intermediate piece corresponds to a very small change in measure, so that adjustment to measure may take place within narrow limits.

In one embodiment of the invention, the intermediate piece is preferably located between two abutment stops forming part of the housing, each abutment stop comprising a set screw, which screws jointly determine the position of the intermediate piece in the housing.

In order that the invention may be more clearly understood and readily carried into effect, it will now be described more fully with reference to the accompanying drawing, given by way of example.

The reference numeral 1 denotes a U-shaped housing comprising two measuring beams 2 and 3 which are each provided with hard metal measuring surfaces 4 and 5. Fitted between the measuring beams is a trapezoidal intermediate piece 6 having three mutually perpendicular sides and one converging side, the latter engaging the measuring beam 3. An abutment stop 7 forming part of the housing comprising a screw 8. At the lower side, the housing is furnished with a screw 9, the position of the intermediate piece 6 being determined by screws 8 and 9. By a screw 10 the assembly of measuring beams and intermediate piece is urged against the surface 11 of the housing, the position of the measuring beam 3 being determined by a screw 12. It will be appreciated that the gauge has two possibilities of adjustment. The measuring beam is displaceable in a longitudinal direction by means of screws 8 and 9, both expedients changing the measure of the gauge due to the trapezoidal intermediate piece. From the embodiment represented, it is seen that it is not necessary for the trapezoidal intermediate piece to be machined very accurately to measure. In mounting the gauge any measure discrepancies can be compensated to a first degree of approximation by displacing this intermediate piece, thus moreover obtaining the advantage of possible displacement of the measuring beam being reserved for after-adjustment of the gauge in service.

What I claim is:

1. A gauge comprising a U-shaped housing, two measuring beams fitted in said housing, a trapezoidal intermediate piece in said housing between said two beams, means to adjust said intermediate piece in a direction parallel to the longitudinal axis of said measuring beams, and means to adjust one of said measuring beams in the direction of the longitudinal axis of said one measuring beam.

2. A gauge comprising a U-shaped housing, two measuring beams fitted in said housing, a trapezoidal intermediate piece in said housing fitted between said two beams, an abutment stop at each end of said intermediate piece, each of said abutment stops comprising an adjustable screw abutting each end of said intermediate piece whereby the adjustment of said screws jointly determine the position of said intermediate piece relative to said measuring beams in a direction parallel to the longitudinal axis of said measuring beams.

3. A gauge comprising a U-shaped housing, two measuring beams fitted in said housing, a trapezoidal intermediate piece in said housing fitted between said two beams, an adjustable screw in the wall of the leg of said housing in engagement with one of said measuring beams to wedge said intermediate piece between said measuring beams and to urge said other measuring beam against the wall of the other leg of said housing, an abutment stop at each end of said intermediate piece, each of said abutment stops comprising an adjustable screw abutting each end of said intermediate piece whereby the adjustment of said screws jointly determine the position of said intermediate piece relative to said measuring beams in a direction parallel to the longitudinal axis of said measuring beams.

ADRIANUS BRANDT.

References Cited in the file of this patent

FOREIGN PATENTS

| Number | Country | Date |
|---|---|---|
| 546,711 | Germany | Nov. 14, 1931 |
| 12,503 | Great Britain | Feb. 6, 1913 |